United States Patent [19]
DiSalvo et al.

[11] 3,754,131
[45] Aug. 21, 1973

[54] LAMP FOR ILLUMINATING REAR LICENSE PLATES OF MOTOR VEHICLES

[75] Inventors: Salvatore DiSalvo; Francesco Guglielmino, both of Turin, Italy

[73] Assignee: FIAT Societa per Azioni, Turin, Italy

[22] Filed: Jan. 6, 1972

[21] Appl. No.: 215,718

[30] Foreign Application Priority Data
Jan. 14, 1971 Italy .............................. 52826 A/71

[52] U.S. Cl. ......... 240/7.1 G, 240/8.1 R, 240/41 R, 240/41.3
[51] Int. Cl. .............................................. B60g 1/26
[58] Field of Search ..................... 240/7.1 G, 8.1 R, 240/7.1 R, 7.35, 8.2, 8.22, 8.24, 8.3, 41 R, 41.35 A, 41.5, 52.1, 41 SC, 41 BM, 41 L

[56] References Cited
UNITED STATES PATENTS
| | | | |
|---|---|---|---|
| 3,125,299 | 3/1964 | Woofter et al. | 240/7.1 R |
| 1,771,319 | 7/1930 | Schmidt | 240/7.1 R |
| 2,167,791 | 8/1939 | Wyatt | 240/7.1 G X |
| 3,242,329 | 3/1966 | Abrams | 240/7.1 R |
| 3,594,569 | 7/1971 | Cranmore | 240/8.1 R |

FOREIGN PATENTS OR APPLICATIONS
| | | | |
|---|---|---|---|
| 794,707 | 9/1968 | Canada | 240/8.2 |
| 1,038,870 | 5/1953 | France | 240/7.1 G |
| 1,070,512 | 12/1959 | Germany | 240/7.1 G |

*Primary Examiner*—Samuel S. Matthews
*Assistant Examiner*—E. M. Bero
*Attorney*—Richard C. Sughrue, Robert V. Sloan et al.

[57] ABSTRACT

A lamp for illuminating the rear license plate of a vehicle has a transparent plastics casing over which a plastics cover fits, two protuberances of the casing fitting into two apertures in the cover to provide the desired illumination. The cover has fixing pins which snap-engage in slidable blocks trapped behind the rear bumper of the vehicle to locate the lamp in a seat in the bumper. Respective metal contacts have integral blade connectors which project through the bottom of a plastics lampholder with which the casing is snap-engaged, to make contact with two lamp bulbs in the casing.

4 Claims, 27 Drawing Figures

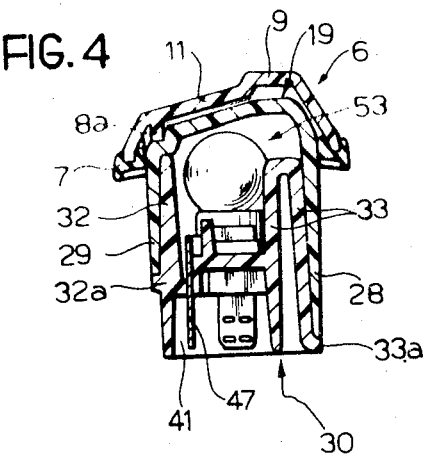
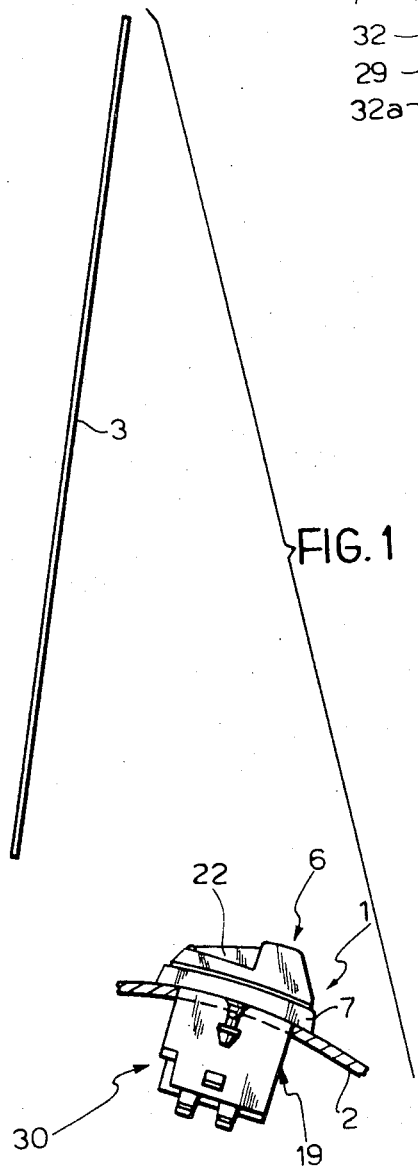
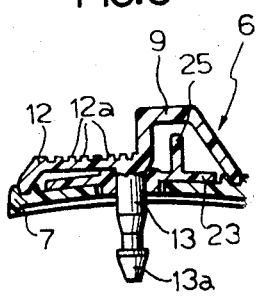

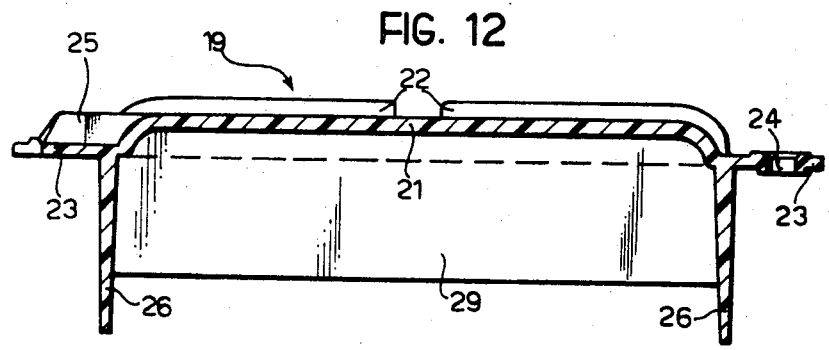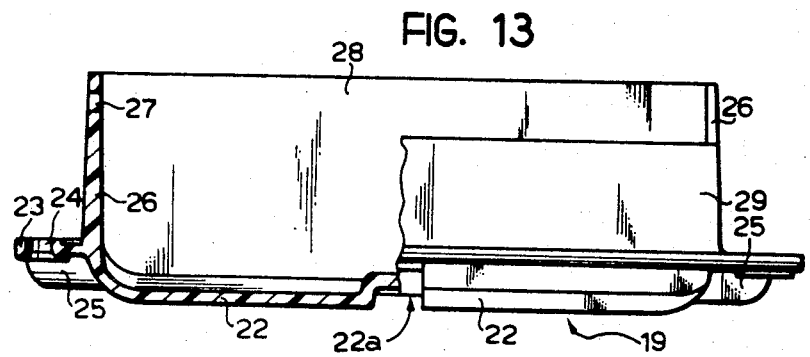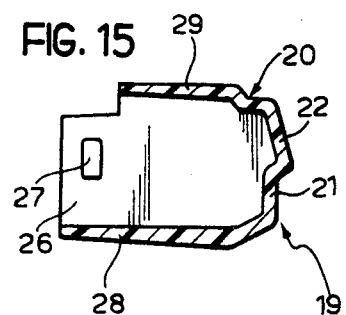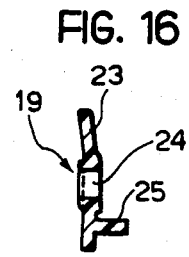

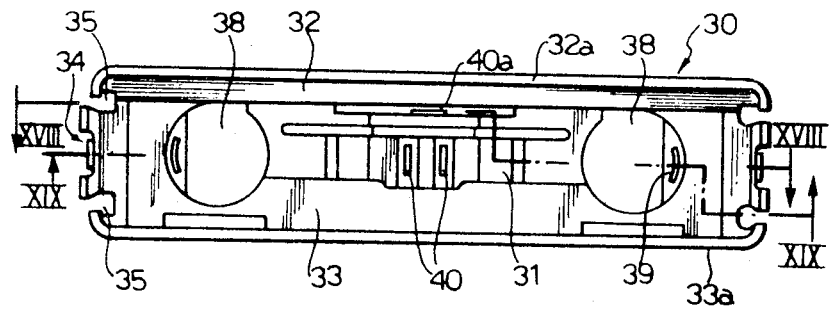
FIG. 17
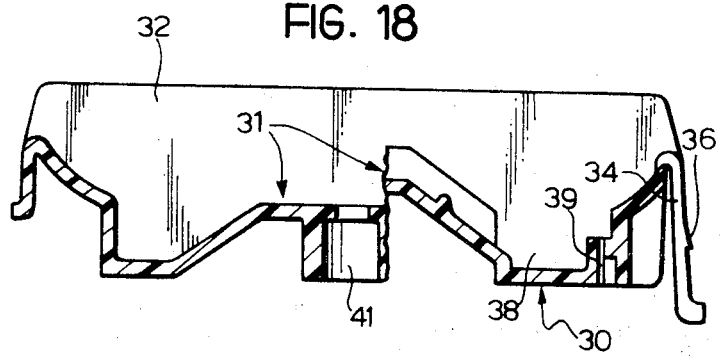
FIG. 18
FIG. 22
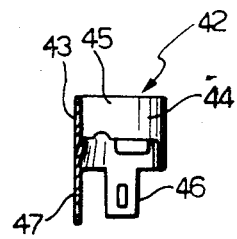
FIG. 24
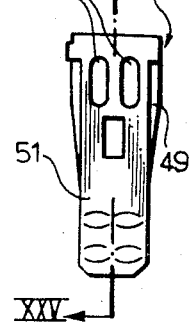

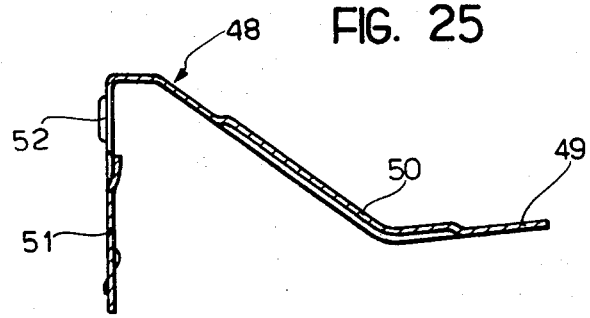
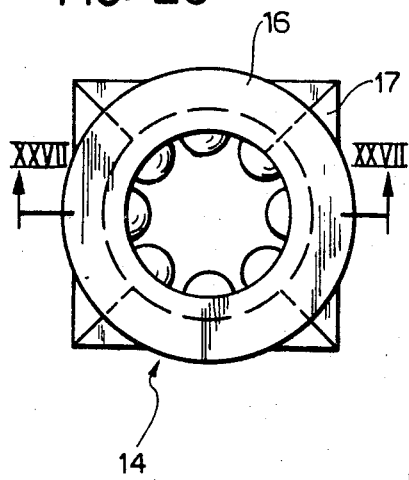
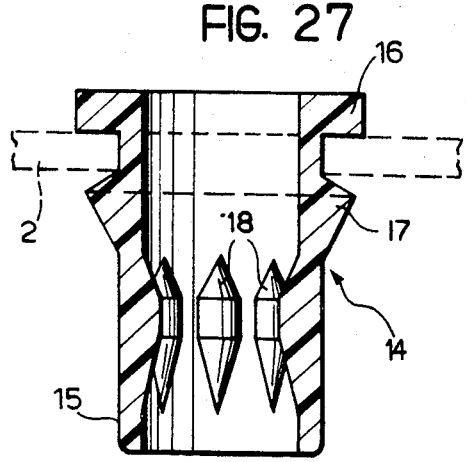

LAMP FOR ILLUMINATING REAR LICENSE PLATES OF MOTOR VEHICLES

BACKGROUND AND OBJECTS OF THE INVENTION

This invention relates to lamps for illuminating rear license plates of motor vehicles, more particularly lamps adapted to be fitted to the rear bumpers of vehicles.

Known lamps of the aforesaid type are of complicated construction and are time-consuming and difficult to assemble, consisting usually of a large number of parts. Moreover such lamps do not provide satisfactory illumination according to the various existing regulations and for license plates of different shapes and dimensions.

An object of this invention is to avoid these disadvantages by providing a lamp of the aforesaid type which is of very simple, robust and economical construction and which consists of a relatively small number of easily assemblable parts.

A further object of the invention is to provide a lamp of the aforesaid type which can be easily taken apart and partly disassembled to afford easy access to the lamp bulb or bulbs.

Another object of the invention is to provide a lamp of the aforesaid type which can be fitted to bumpers with different radii of curvature while being capable of giving satisfactory illumination of a vehicle license plate according to different regulations and with different shapes and dimensions.

Another object of the invention is to provide a lamp of the aforesaid type which is substantially waterproof, to protect its internal parts.

SUMMARY OF THE INVENTION

According to the present invention there is provided a lamp for illuminating the rear license plate of a motor vehicle, the lamp being adapted to be fitted to the rear bumper of the vehicle, wherein the lamp comprises a cover of plastics material, fitted with fixing pins adapted to be snapped into fixing blocks located on the bumper, a substantially box-shaped casing element of transparent plastics material having two elongated protuberances aligned on a common longitudinal axis and adapted to fit into apertures of corresponding shape formed in the cover, a lampholder element, also of plastics material, snap-engaged with the transparent casing element, a metal common contact element having two tubular portions adapted to receive two separate lamp bulbs, the common contact element being secured to the lampholder element by means of two fixing tabs at each end and a central blade which projects through said lampholder element, and two end contact elements secured to the lampholder element by respective blades projecting through said element and adapted to engage end electrode contacts of the respective lamp bulbs.

BRIEF DESCRIPTION OF THE DRAWINGS

The invention will be further described by way of non-limiting example with reference to the appended drawings, in which:

FIG. 1 is a lateral diagrammatic view in elevation of an assembled lamp according to one embodiment of the invention in position for illuminating a license plate of a motor vehicle;

FIGS. 4 and 5 are two transverse cross sections of the lamp, taken along lines IV — IV and V — V respectively of FIG. 3;

FIGS. 12 and 13 are two longitudinal sections taken respectively along lines XII — XII and XIII — XIII of FIG. 11;

FIGS. 14, 15, 16 are three transverse cross sections, taken respectively along lines XIV — XIV, XV — XV, and XVI — XVI of FIG. 11;

FIG. 17 is a plan view of the lampholder element of the lamp;

FIGS. 18 and 19 are two longitudinal sections, taken respectively along lines XVIII — XVIII and XIX — XIX of FIG. 17;

FIG. 22 is a transverse cross section of the common contact element, taken along line XXII — XXII of FIG. 21;

FIG. 24 is a front elevational view of the end contact element of FIG. 23;

FIG. 25 is a longitudinal section of the end contact element, taken along line XXV — XXV of FIG. 24;

FIG. 26 is a plan view of an enlarged scale of one of the fixing blocks of the lamp, and FIG. 27 is a longitudinal section of the fixing block, taken along line XXVII — XXVII of FIG. 26;

DETAILED DESCRIPTION OF THE ILLUSTRATED EMBODIMENT

Figure 2:
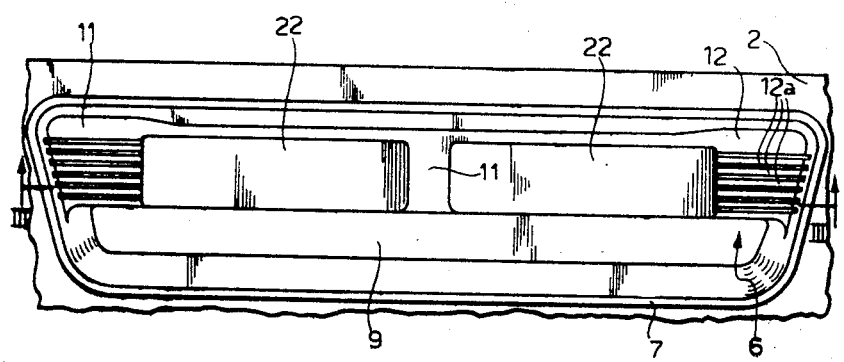
FIG. 2 is a plan view of the lamp.

Referring to FIG. 1, reference numeral 1 indicates in its entirety a lamp according to the invention for illuminating the rear license plate 3 of a motor vehicle. The lamp 1 is adapted to be built into the rear bumper 2 of the vehicle, the license plate 3 being positioned above the bumper 2.

As shown in FIGS. 2 to 5, the lamp 1 comprises an outer cover 6 of plastics material, a transparent box-like casing element 19, a lampholder element 30, also molded in plastics material, and a number of metal electrical contact elements. The contact elements transmit current to two lamp bulbs 53 removably fitted within the lampholder element 30 with their axes substantially vertical when the lampholder element is horizontal.

Figure 6:
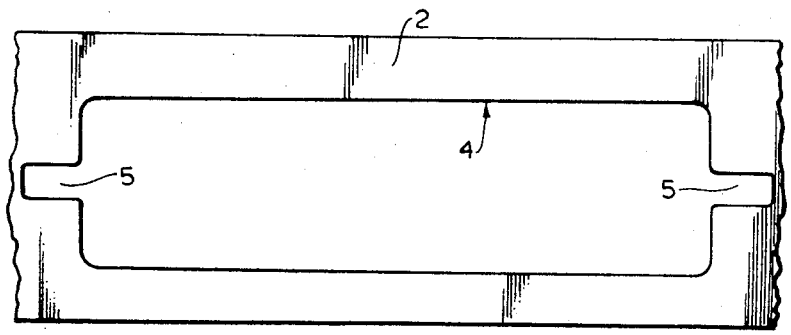
FIG. 6 is a plan view of a central portion of a rear fender prepared for the fitting of the lamp of FIGS. 1 to 5.
Figure 7:
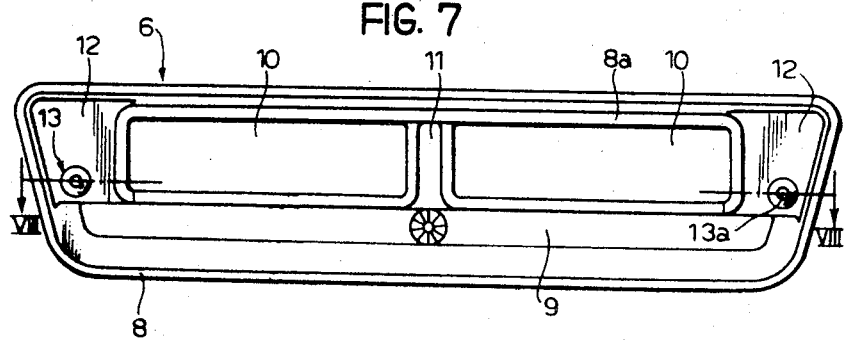
FIG. 7 is a plan view of the interior of the single cover of the lamp of FIGS. 1 to 5.
Figure 9:
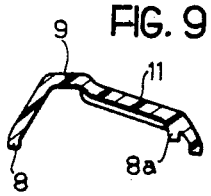
FIGS. 9 and 10 are two transverse cross sections of the lamp cover, taken respectively along the lines IX — IX and X — X of FIG. 8.
Figure 8:
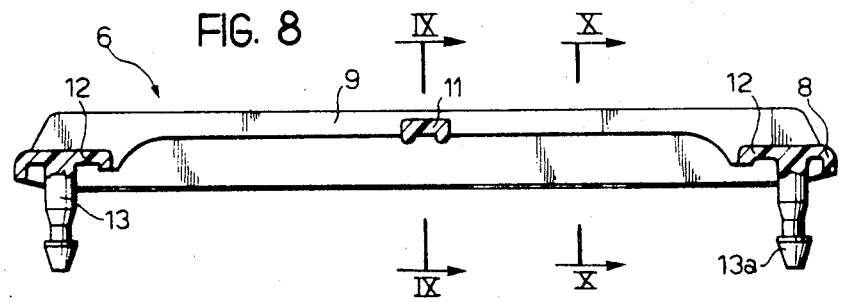
FIG. 8 is a longitudinal section of the lamp cover, taken along line VIII — VIII of FIG. 7.
Figure 11:
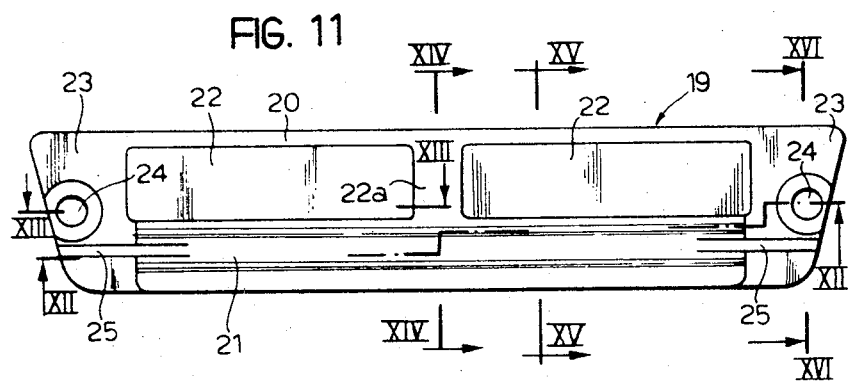
FIG. 11 is a plan view of the lower part of the transparent body of the lamp.
Figure 10:
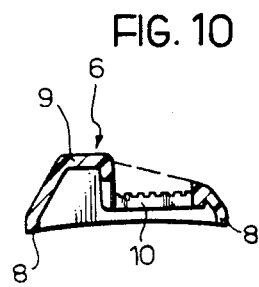
Figure 14:
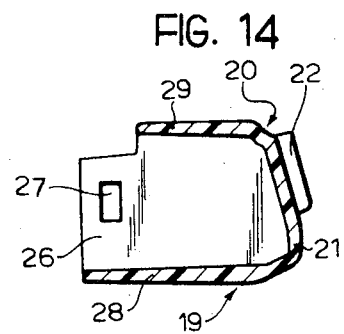

The lamp 1 is fitted in a rectangular seating aperture 4 made in the bumper 2 (FIG. 6) and provided at its ends with elongate slots 6. Two fixing blocks 14, shown in detail in FIGS. 26 and 27, are adapted to slide along the slots 5 to provide for necessary adjustment of the position of the lamp 1, the two fixing blocks 14 being molded in plastics material. Each of the fixing blocks 14 comprises a tubular member 15 formed at one end with an external retaining flange 16 and intermediate its ends with four projections 17 spaced at equal angular intervals around the member 15 at equal distances from the flange 16, the projections 17 together forming a square profile in plan (FIG. 26) and cooperating with the edges of each slot 5 in the bumper 2 to permit snap-engagement of the block 14 with the bumper 2 (shown in broken outline in FIG. 27). The tubular casing 15 is formed with a number of internal shaped projections 18, distributed at equal circumferential intervals and adapted to cooperate with respective cuneiform heads 13a formed on respective fixing pins 13 attached to the cover 6 of the lamp 1.

The cover 6, as shown in FIGS. 7 to 10, consists of transparent molded plastics material having a peripheral rim 8 adapted to engage a channel-section annular sealing element 7 of resiliently yieldable material interposed between the cover 6 and the bumper 2. The cover 6 has a longitudinally extending raised portion 9, adjacent which are located two longitudinally elongated apertures 10, aligned with each other along a common longitudinal axis and separated by an intermediate bridge piece 11. A longitudinally extending rib 8a is formed on the inside of the cover 6 and extends along the edges of the apertures 10 opposite the raised portion 9.

Figure 3:
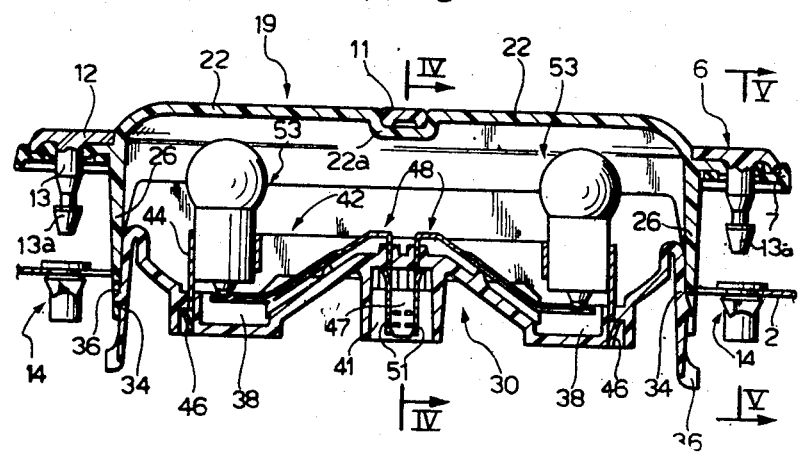
FIG. 3 is a longitudinal section of the lamp, taken along line III — III of FIG. 2.

At the two ends of the cover 6 there are provided two substantially flat end portions 12 having ornamental flutings 12a on their upper surfaces. The two fixing pins 13, preferably of metal are incorporated in the end portions 12 and project downwards in the normal position of mounting of the lamp 1 (FIG. 3).

The cover 6 may be molded in colored plastics material, possibly metal coated. The cover 6 is opaque and serves to shield the light emitted by the two lamp bulbs 53 in use of the lamp, distributing the light provided by the lamp through the apertures 10 to illuminate the rear license plate 3 in accordance with the prevailing regulations.

The shape and the position of the two apertures 10 in the cover 6 is such as to ensure adequate illumination of both upright (e.g., square) and elongate license plates.

The transparent casing element 19 is interposed between the cover 6 and the bumper 2. The casing element 19, molded from thermoplastics material, is shown in FIGS. 11 to 16. The casing element 19 includes an upper shaped longitudinal rib 21 and, along one of its two lateral sides, a longitudinally extending shoulder 20 which makes contact with the rib 8a of the cover 6 upon assembly of the lamp 1. The casing element 19 has two longitudinally extending walls 28, 29 along its opposite lateral sides, the wall 28 being adapted to engage the raised portion 9 of the cover 6. The casing element 19 also has two rectangular protuberances 22 arranged side by side and adapted to fit into the apertures 10 in the cover 6. The two protuberances 22 are aligned on a common longitudinal axis and are separated by an intermediate depressed part 22a. The casing element 19 is provided at opposite ends with flat lugs 23 having respective holes 24 for the through passage of the fixing pins 13 of the cover 6. Beside the holes 24 respective longitudinal upstanding ribs 25 are provided, the ribs projecting upwards in order to restrain the cover 6 laterally.

The transparent casing element 19 also has two parallel internal transverse walls 26 which project downwards in the normal installed position of the lamp 1 and are fitted with rectangular windows 27. The longitudinal walls 28, 29 are of different height and are attached to the transverse walls 26, forming a box structure.

Figure 19:
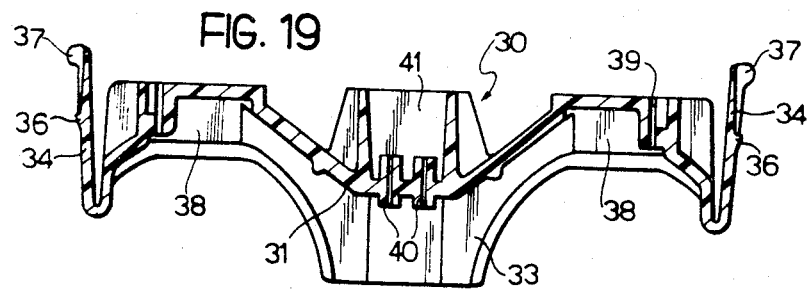

Upon assembly of the lamp 1, a lampholder element 30, shown in FIGS. 17, 18 and 19, molded in plastics material, is fitted into the casing element 19. The lampholder element 30 consists of a shaped base 31 bounded on one side by a longitudinal wall 32 of uniform height and on the other side by a longitudinal wall 33 parallel wall 32 but with a shaped profile (FIG. 19). The two longitudinal walls 32, 33 are formed with laterally outwardly projecting ridges 32a, 33a, situated at different heights and arranged to cooperate with the lower edges of the two longitudinal walls 29 and 28 of the transparent casing element 19, as shown in FIG. 4.

The lampholder element 30 is provided at its opposite ends with two transverse spring tabs 34, separated from the longitudinal walls 32, 33 by pairs of recesses 35 (FIG. 17). Each tab 34 is provided with an intermediate wedge-shaped tooth 36 adapted to snap-engage in the windows 27 of the transverse walls 26 of the transparent casing element 19. Each tab 34 also has a cutaway external portion 37 which forms a ventilation aperture for the inside of the lamp 1 when the latter is assembled.

The shaped base 31 is formed with two seats 38 for receiving the lamp bulbs 53, each seat 38 having vertical slots 39 of arcuate cross-section extending therethrough. In the centre of the base 31 there are provided two parallel transverse slots 40 and a longitudinal slot 40a, all three slots being surrounded by an annular wall 41 which projects downwardly from the base 31 in its normal position of assembly (FIG. 18).

Upon asssembly of the lamp 1 the lampholder element 30 is snapped on to the transparent casing element 19. By manually pressing together the spring tabs 34 of the lampholder element 30 it is possible to remove the lampholder element 30, allowing free access to the two lamp bulbs 53, for example to replace the latter. This facilitates dismantling of the lamp 1 when it is fitted in a relatively inaccessible place such as the lamp of the illustrated embodiment, which is fitted inside the bumper 2.

Figure 20:
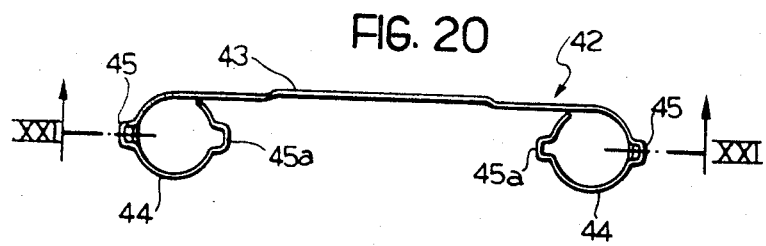
FIG. 20 is a plan view of the common contact element of the lamp.
Figure 21:
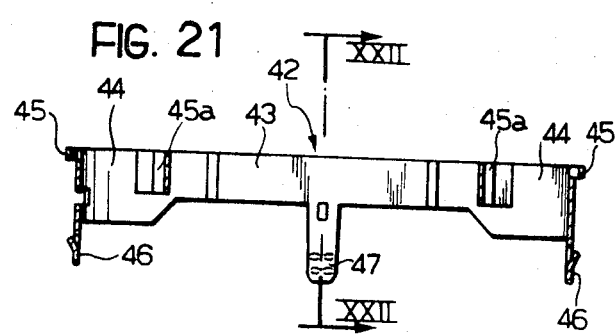
FIG. 21 is a longitudinal section of the common contact element, taken along line XXI — XXI of FIG. 20.

A metal common contact element 42, illustrated in FIGS. 20, 21 and 22 is fixed to the base 31 of the lampholder element 30. The common contact element 42 is in the form of a cut-out clip and comprises a bridge strip 43 and two tubular end portions 44. Each end portions 44 has a pair of diametrically opposite widened portions 45, 45a, formed by bending of the element 42 and forming respective sockets for receiving and making electrical contact with the bases of the respective lamp bulbs 53. At the two ends of the contact element 42 two parallel fixing tabs 46 are provided. The tabs 46 are upon assembly of the lamp 1 snapped into the slots 39 of the lampholder element 30. A flat central blade 47 acting as a plug is provided in the centre of the contact element 42 and is adapted to be fitted into the central longitudinal slot 40a of the lampholder element 30 and to project from the lower face of the base 31, as shown in FIG. 3.

Figure 23:
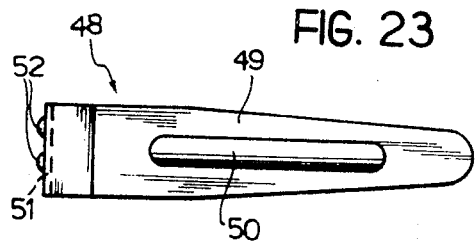
FIG. 23 is a plan view of one of the end contact elements of the light.

Adjacent the base 31 of the lampholder element 30 there are also placed, symmetrically, two shaped end contact elements 48, made by the cutting out and pressing of metal strips, and illustrated in FIGS. 23, 24 and 25. Each of the end contact elements 48 comprises an upper shaped part 49 having a longitudinal reinforcing rib 50 and an upstanding blade 51 acting as a plug. The blade 51 has raised portions 52 which assist the tight engagement of the blade 51 into one of the central parallel transverse slots 40 of the lampholder element 30.

When the lamp 1 is assembled, the contact element 42 is placed on the base 31 of the lampholder element 30 so as to guide and support the bases of the two bulbs 53 inserted in the two tubular seats 44. The shaped contact elements 48 make connections to end electrode contacts of the lamp bulbs 53 (FIG. 3) while the tubular end portions 44 of the contact element 42 make contact with the metal casings of the bases of the lamp bulbs 53, so that energising circuits for the two bulbs 53 are completed between the blade 47 and the two blades 51 which constitute respective plugs or tabs for making external electrical connections to the lamp 1.

The lamp herein described is easily assembled from a small number of parts; it is easily dismantled for access to the lamp bulbs, and it is affixed to the vehicle fender easily and quickly.

It will be appreciated that many modifications may be made in the embodiment herein described without departing from the scope of the invention.

We claim

1. A lamp assembly for illuminating the rear license plate of a motor vehicle comprising a transparent casing having a substantially rectangular box-shaped configuration adapted to be received in a complementary sized aperture in the bumper of a motor vehicle, said casing being open along one of the longitudinal sides thereof and having two spaced-apart protuberances extending outwardly from the surface of the opposite side and two apertured securing tabs extending outwardly from each end thereof, a lamp holder element having a substantially rectangular configuration disposed in said casing closing the open side of said casing, releasable interfitting engagement means for releasably connecting said lamp holder element to said casing, a cover member having a substantially rectangular configuration slightly larger than said casing and having a pair of spaced-apart apertures therein complementary in size to said protuberances, said cover being disposed in overlying engagement with said casing with the protuberances on said casing extending through said apertures, connecting means secured to opposite ends of said cover means and extending through said apertured tabs on said casing for securing said cover member and casing to said bumper, and a common metal contact strip having two tubular portions integral with opposite ends of said strip and adapted to receive and to make contact with the base of two separate bulbs, two mounting tabs integral with said tubular portions securing said strip to the lamp holder element and a central blade integral with said strip and projecting outwardly through said lamp holder element.

2. A lamp assembly as set forth in claim 1 further comprising two contact elements for engaging the end contacts on said bulbs, each of said contact elements having blade means integral therewith projecting through said lamp holder element and securing said contact elements to said lamp holder element.

3. A lamp assembly as set forth in claim 2 further comprising an annular wall integral with said lamp holder element and extending outwardly therefrom, said blade on said common contact strip and said blades on said contact elements each extending outwardly through said lamp holder element within said annular wall for connection to external electrical circuitry.

4. A lamp assembly as set forth in claim 1 wherein said protuberances on said casing and said complementary apertures in said cover have a rectangular configuration.

* * * * *